(12) United States Patent
Wang et al.

(10) Patent No.: US 12,471,505 B2
(45) Date of Patent: Nov. 11, 2025

(54) SELF-ASSEMBLED AVALANCHE-RESPONSIVE DEVICE AND PREPARATION THEREOF

(71) Applicant: Fudan University, Shanghai (CN)

(72) Inventors: Ming Wang, Shanghai (CN); Jie Cao, Shanghai (CN)

(73) Assignee: Fudan University, Shanghai (CN)

( * ) Notice: Subject to any disclaimer, the term of this patent is extended or adjusted under 35 U.S.C. 154(b) by 382 days.

(21) Appl. No.: 18/305,363

(22) Filed: Apr. 23, 2023

(65) Prior Publication Data

US 2023/0422637 A1    Dec. 28, 2023

(30) Foreign Application Priority Data

Jun. 25, 2022 (CN) .......................... 202210731785.4

(51) Int. Cl.
*H10N 70/00* (2023.01)
*H10N 70/20* (2023.01)

(52) U.S. Cl.
CPC ........... *H10N 70/021* (2023.02); *H10N 70/20* (2023.02)

(58) Field of Classification Search
CPC ........ G06N 3/0442; G06N 3/063; G06N 3/09; G06N 20/00; G06N 3/049; G06N 3/061; G06N 3/08; H10N 70/823; H10N 70/881; H10N 70/826; H10N 70/00

See application file for complete search history.

(56) References Cited

U.S. PATENT DOCUMENTS

| | | | |
|---|---|---|---|
| 9,851,267 B1* | 12/2017 | Ma ............................ | G01L 1/20 |
| 2017/0141302 A1* | 5/2017 | Bessonov .......... | H10N 70/8833 |
| 2021/0020241 A1* | 1/2021 | Afzali-Ardakani ........................ H10K 19/202 | |
| 2021/0202836 A1* | 7/2021 | Kajiro .................. | H10N 70/826 |

FOREIGN PATENT DOCUMENTS

CN         114716737 A  *  7/2022   ................ C08L 7/00

OTHER PUBLICATIONS

John Moon et al., "Temporal data classification and forecasting using a memristor-based reservoir computing system", Nature Electronics, vol. 2, Oct. 2019, pp. 480-487.

(Continued)

*Primary Examiner* — William B Partridge
*Assistant Examiner* — Felix B Andrews
(74) *Attorney, Agent, or Firm* — JCIPRNET

(57) ABSTRACT

The present invention relates to a self-assembled avalanche-responsive device and the preparation and application thereof. The responsive device is prepared through the following process: (1) taking an insulating substrate and depositing metal electrodes on both ends of an upper surface of the insulating substrate; (2) taking a nano-conductive filler and an interface modifier, adding the nano-conductive filler and the interface modifier to an elastomer matrix solution, performing stirring and mixing, and performing ultrasonic dispersion to obtain a conductive polymer solution; and (3) spin-coating the obtained conductive polymer solution onto a silicon substrate through a spin-coating process to cover terminals of the two metal electrodes provided opposite to each other; and performing drying, so as to obtain a responsive layer, so that the process is completed.

7 Claims, 7 Drawing Sheets

(56) References Cited

OTHER PUBLICATIONS

Jie Yu et al., "Energy efficient and robust reservoir computing system using ultrathin (3.5 nm) ferroelectric tunneling unctions for temporal data learning", 2021 Symposium on VLSI Technology Digest of Technical Papers, Jun. 13-19, 2021, pp. 1-2.
Jacob Torrejon et al., "Neuromorphic computing with nanoscale spintronic oscillators", Nature, vol. 547, Jul. 27, 2017, pp. 1-5.
Gianluca Milano et al., "In materia reservoir computing with a fully memristive architecture based on self-organizing nanowire networks", Nature Materials, vol. 2, Feb. 2022, pp. 195-204.
Gianluca Milano et al., "In materia reservoir computing with a fully memristive architecture based on self-organizing nanowire networks", Nature Portfolio, Supplementary information, Feb. 2022, pp. 1-60.

* cited by examiner

SELF-ASSEMBLED AVALANCHE-RESPONSIVE DEVICE AND PREPARATION THEREOF

CROSS-REFERENCE TO RELATED APPLICATION

This application claims the priority benefit of China application serial no. 202210731785.4, filed on Jun. 25, 2022. The entirety of the above-mentioned patent application is hereby incorporated by reference herein and made a part of this specification.

BACKGROUND

Technical Field

The present invention pertains to the technical field of an electronic device and relates to a self-assembled avalanche-responsive device and the preparation and application thereof.

Description of Related Art

A reservoir computing system is a neuromorphic computing paradigm that is good at processing sequential tasks. The reservoir computing system has the advantages of easy training, fast speed, and high energy efficiency, and the system is significantly applied in information processing such as speech recognition, image recognition, and chaotic system prediction. The reservoir computing system consists of three parts: an input layer, a reservoir network layer, and an output layer, where the reservoir network layer is composed of arbitrarily connected neuron node networks, which can nonlinearly map input information to a high-dimensional state space, so as to facilitate the reading, training, and identification of the output layer. Therefore, in order to realize the functions of the reservoir computing system, the reservoir network layer needs to possess two key characteristics of dynamic nonlinear response and short-term memory characteristics.

The hardware-based reservoir computing system has unique advantages in terms of computing speed and energy consumption. At present, the hardware implementation of the reservoir computing system mainly focuses on the development of physical devices with a dynamic nonlinear response and a short-term memory characteristic to simulate a mapping function of the reservoir network layer. These various types of physical devices mainly include dynamic volatile RRAMs, spin torque nano-oscillators, silicon-based photonic devices, and ferroelectric memory, etc. However, the above-mentioned devices, used as the unit of reservoir network, still have some critical deficiencies during the information process: the electrical stability of the device is poor, thereby reducing the mapping quality of the reservoir network to the input information; and the response complexity of the unit device is insufficient to control the mapping capability of the network node, resulting in insufficient calculation accuracy of the system.

The responsive device constructed using the self-assembled network of conductive nanoparticles can present dynamic nonlinear response and spontaneous recovery characteristics to external stimuli, so the device can be used for reservoir computing. The self-assembled network can also directly and effectively simulate the complex topological network structure of the brain and the avalanche-responsive characteristics of neurons, and its preparation process is easy with low cost. However, as shown in FIG. 1 and FIG. 2, due to the random and disordered distribution of the self-assembled network, the electrical response uniformity of such devices is poor, which will severely limit the spatial mapping accuracy of the reservoir network to information.

SUMMARY

The purpose of the present invention is to provide a self-assembled avalanche-responsive device and the preparation and application thereof.

The purpose of the present invention may be implemented through the following technical solutions.

The first technical solution of the present invention provides a self-assembled avalanche-responsive device, including an insulating substrate, metal electrodes deposited on both ends of the insulating substrate, and a responsive layer deposited on the insulating substrate and located between the two metal electrodes. Preferably, a silicon substrate is used as the insulating substrate.

The second technical solution of the present invention provides a preparation method for the self-assembled avalanche-responsive device, including the following step:

(1) taking an insulating substrate and depositing metal electrodes on both ends of an upper surface of the insulating substrate;

(2) taking a nano-conductive filler and an interface modifier, adding the nano-conductive filler and the interface modifier to an elastomer matrix solution, performing stirring and mixing, and performing ultrasonic dispersion to obtain a conductive polymer solution; and (3) spin-coating the obtained conductive polymer solution onto the insulating substrate through a spin-coating process to cover terminals of the two metal electrodes provided opposite to each other; and performing drying after the spin-coating to obtain a conductive polymer film as a responsive layer, so that the preparation of the self-assembled avalanche-responsive device is completed.

Further, in step (1), the insulating substrate is a monocrystalline silicon wafer or a silicon oxide wafer.

Further, in step (1), the material for the metal electrode is selected from one or more of Au, Ag, Pt, Cu, TiN alloy, CuAg alloy, and AuAg alloy.

Further, in step (2), an elastomer matrix in the elastomer matrix solution is selected from one or more of polyacrylate elastomer, thermoplastic polyurethane, waterborne polyurethane, natural rubber, epoxidized natural rubber, dimethyl siloxane, and styrene-ethylene-butadiene-styrene block copolymer;

a solvent used in the elastomer matrix solution is water or an organic solvent, wherein the organic solvent is selected from one or more of methanol, ethanol, toluene, chloroform, acetone, dimethylformamide, and dimethyl sulfoxide; and the mass fraction of the elastomer matrix solution is 5~80%.

Further, in step (2), the interface modifier is an amphiphilic molecule or an amphiphilic polymer with a hydrophilic and lipophilic chemical group, specifically selected from one or more of sodium n-alkyl benzene sulfonate, lignosulfonate, sodium alcohol ether sulfate, sodium dodecyl sulfate, glyceryl stearate, alkyl polyether, primary alcobol ethoxylate, nanocellulose, etc.

Further, in step (2), the nano-conductive fillers are metal nanoparticles, metal nanowires, carbon nanotubes, graphene, or other two-dimensional conductors or semiconductor materials. The metal nanoparticles include gold nanoparticles and silver nanoparticles, and metal nanowires include gold nanowires and silver nanowires.

Further, in step (2), the mass ratio of the nano-conductive filler and the elastomer matrix is 0.5~100:100; and the mass ratio of the nano-conductive filler and the interface modifier is (0.1~10):1.

Further, in step (2), stirring process conditions are specifically as follows: magnetic stirring is carried out at room temperature for 20~40 min, preferably 30 min, with a stirring speed of 300~500 rpm, preferably 400 rpm; an ultrasonic dispersion process is specifically as follows: the ultrasonic dispersion is carried out with a ultrasonic cell crusher with an ultrasonic power of 200~400 W, preferably 300 W, and a total ultrasonic duration of 20~40 min, preferably 30 min.

Further, in step (3), a spin-coating speed is 1000~7000 rpm, preferably 5000 rpm, and a spin-coating duration is 0.5~1.5 min, preferably 1 min.

A drying temperature is 30~80° C., preferably 50° C., and a drying duration is 2-6 h, preferably 4 h.

Further, the thickness of the metal electrode is 40 nm-100 nm.

A responsive layer with a conductive percolation network structure is prepared through a controllable assembly strategy in the present invention. The responsive layer consists of elastomer matrices with thermal expansion properties, interface modifier molecules, and nano-conductive fillers. When a pulsed voltage is applied, the conductive network generates Joule heat, which thermally expands the elastomer matrix. Due to the volume expansion of the matrix, a formed conductive path will be disconnected, and the conductance of the device will decrease sharply. When the voltage is removed, the elastomer returns to an original volume thereof, reconnecting the conductive path, and the conductance returns to an original state thereof. Therefore, the device presents an avalanche-like exponential response magnitude to stimuli.

In addition, the interface modifier molecules with hydrophilic and lipophilic properties can connect the nano-conductive fillers and the elastomer matrix through chemical bonds, so that the nano-conductive fillers can be stably assembled at the microscopic interface of the elastomer matrix, enabling the device to present good electrical uniformity.

The third technical solution of the present invention provides an application of a self-assembled avalanche-responsive device, and the self-assembled avalanche-responsive device is used as a reservoir network layer in a reservoir computing system.

The process of applying the self-assembled avalanche-responsive device of the present invention to the reservoir computing system is as follows.

(1) An input layer is configured to pre-process raw data, so as to convert the raw data into a timing input pulse sequence. A hardware replacement of a reservoir network layer is realized through the self-assembled network response device prepared above, and the hardware reservoir network layer can respond to the timing input pulse sequence, so as to realize the high-dimensional spatial feature mapping of input information. An output layer is configured to read and train feature map data.

(2) The response device is connected to an electrical test platform, where one electrode port of the device is connected to an arbitrary waveform generator, and the other port is grounded, so as to implement the reading and recording of an input signal.

(3) Reading and recording of response signals. A programmed timing input pulse sequence is applied to the response device. The pulse width and pulse amplitude of a pulse voltage are adjustable with a pulse width programmable range of 10 us-100 ms and a pulse amplitude programmable range of 1V-10V. After the device has experienced the pulse voltage sequence, the response state of the device is tested and read. A read pulse voltage is 0.1V, a read pulse width is consistent with an input pulse width, and a read interval duration is determined by a recovery duration of a response curve. After each response, the device can spontaneously return to an initial state. Therefore, by repeating the above process, the feature mapping of input information and state collection thereof can be completed.

(4) Training and testing of a read signal. A reading function is trained through a machine learning algorithm. Taking image recognition as an example, through a reading record of network response status data of a reservoir of 20,000 training images, a corresponding data set is obtained. The data set is divided into a training set and a testing set, and an appropriate machine learning algorithm (e.g., logistic regression algorithm, Adam algorithm, random, stochastic gradient descent algorithm, etc.) is selected to perform iterative training connection weights of a training set sample until a certain error accuracy is achieved to complete the training. Finally, a testing set sample is used to evaluate the recognition accuracy of the reservoir computing system.

Compared with the prior art, the present invention has the following advantages.

(1) A developed self-assembled structure avalanche responds to both ends of the device through a controllable assembly strategy. Through the controllable assembly strategy, on the one hand, a critical percolation network can be constructed, so that the device presents an exponential avalanche-responsive characteristic when the device is electrically stimulated, thereby improving the response range of the device; on the other hand, the conductive filler can be assembled with order and stability to construct a dynamic structural response to a stable conductive network, which can present good electrical response uniformity to stimuli due to chemical connections.

(2) A hardware reservoir computing system of an avalanche-responsive device based on a self-assembled structure is configured for information classification and prediction. In addition, due to the above dynamic nonlinear response and short-term memory characteristics of the responsive device, the responsive device is used in a reservoir network layer of a hardware-implemented reservoir computing system, thus replacing a reservoir network layer generated by traditional software.

DESCRIPTION OF THE EMBODIMENTS

Figure 1:
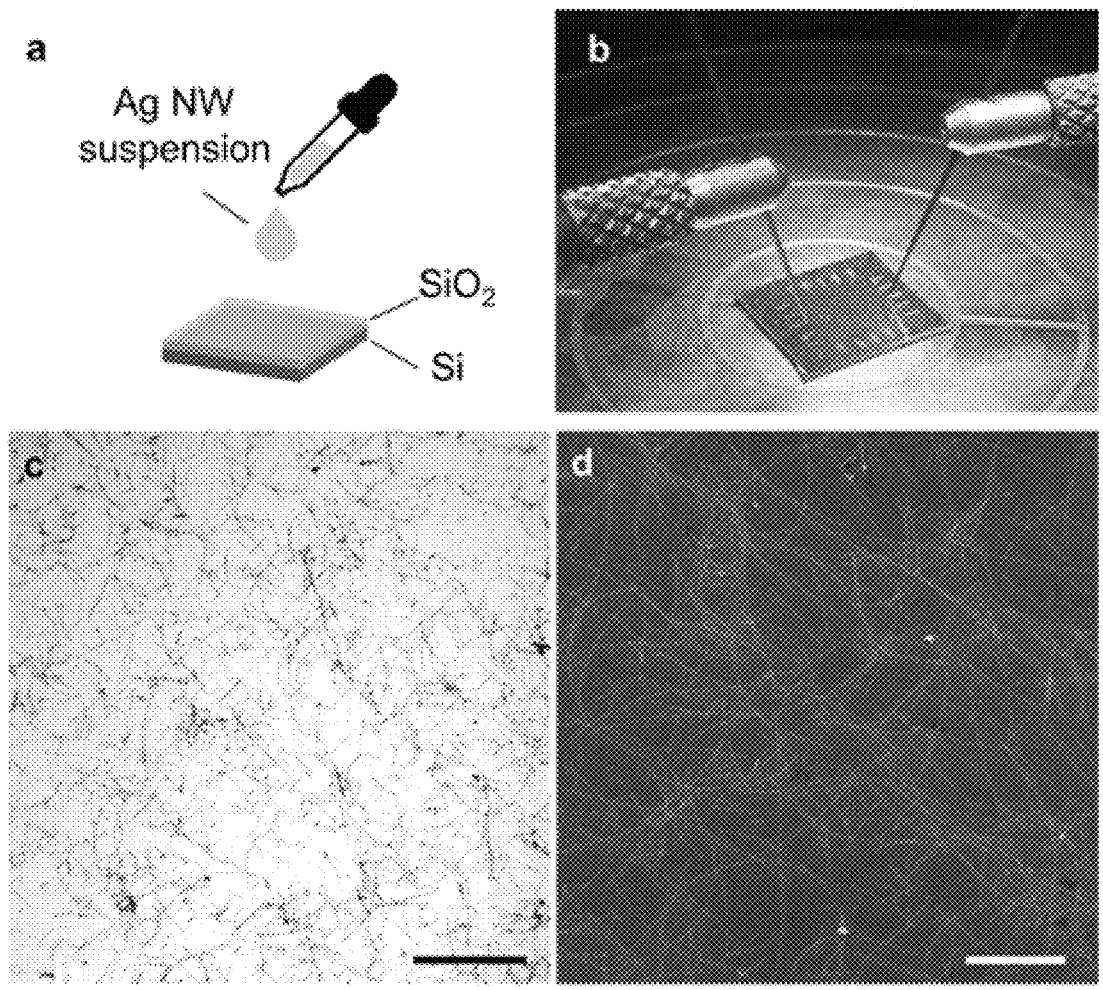
FIG. 1 is a structure and representation diagram of an existing hardware reservoir computing system based on a self-assembled network responsive device.
Figure 2:
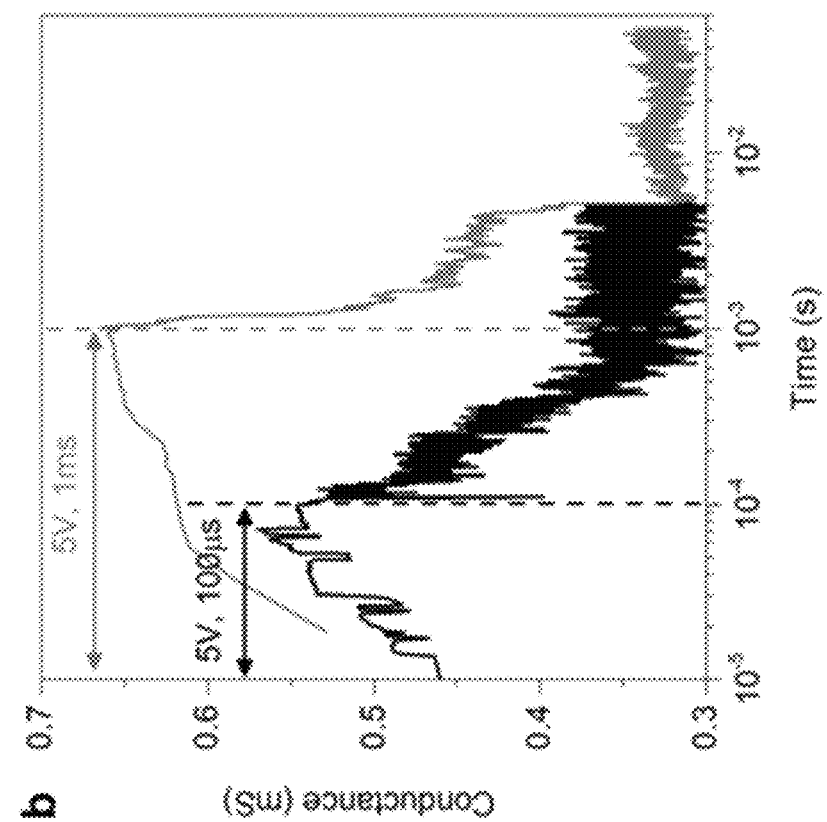
FIG. 2 is a performance diagram of an existing hardware reservoir computing system based on a self-assembled network response device.
Figure 2:
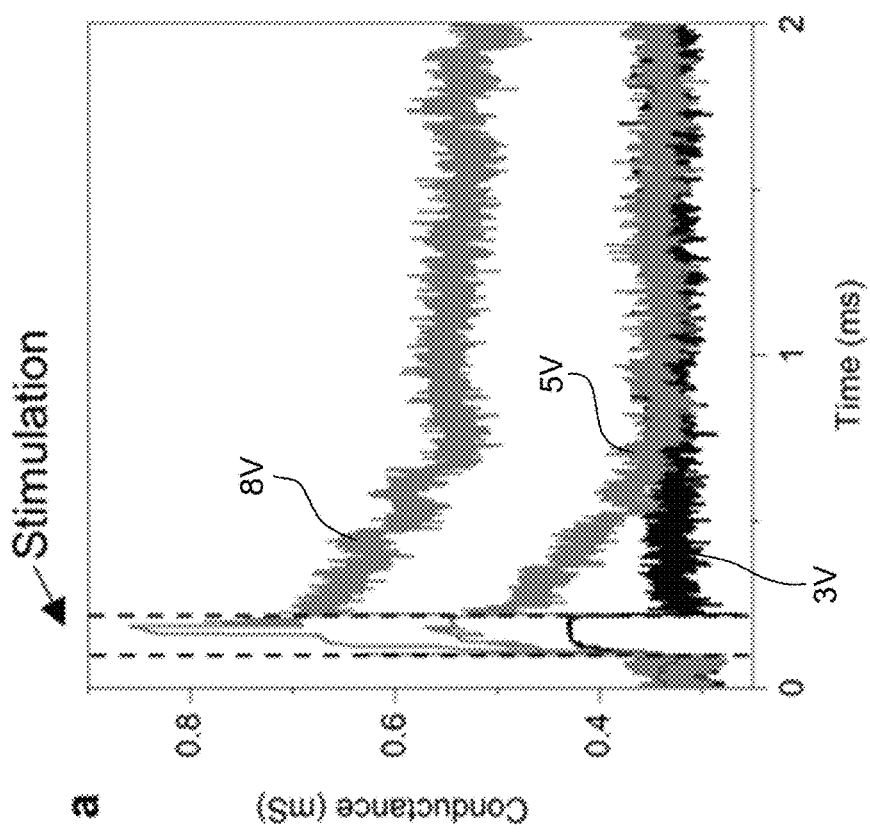

The present invention is described in detail below with reference to the accompanying drawings and specific embodiments. The present embodiment is carried out on the premise of the technical solution of the present invention, and detailed embodiments and specific operation processes are given, but the protection scope of the present invention is not limited to the following embodiments.

In each of the following embodiments, if there is no special description of raw materials or processing techniques, it is shown that the materials are all conventional commercially available raw materials in the art.

Embodiment 1

The present embodiment first provides a preparation method for a self-assembled avalanche-responsive device, including the following step:

Step 1:
 depositing to prepare two metal electrodes on a silicon substrate at first, where an electrode material is Au, the thickness of the metal electrode is about 80 nm; and Step 2:
 1) preparing a conductive polymer solution of a response layer and 2) depositing a response layer film between the metal electrodes at both ends.

1) Silver nanowires and a nanocellulose are added into a waterborne polyurethane solution with a mass ratio of 1:1, and the waterborne polyurethane solution is purchased from BASF with the brand of Joncryl FLX 5002. The mass fraction of the solution is diluted down to 20% by adding water so that the mass ratio of silver nanowires to waterborne polyurethane solution is 1:50. At room temperature, the magnetic stirring is performed for 30 min with a stirring speed of 400 rpm. The ultrasonic dispersion is then performed with a ultrasonic cell crusher with an ultrasonic power of 300 w and a total ultrasonic duration of 30 min. In order to prevent the temperature of the solution from being too high due to too long ultrasonic duration, the strategy of intermittent ultrasonic is adopted, that is, the ultrasound shall be stopped for 10 min after every min of ultrasound for the solution so that the solution can be cooled to room temperature. Through the above operations, a conductive polymer solution with good dispersion in the response layer is obtained.

(2) The above-mentioned conductive polymer solution is spin-coated on both ends of the photolithographically patterned metal electrodes through the spin-coating process. The polymer solution is located between the two metal electrodes and partially covers the ends of the metal electrodes so that there is good contact between the polymer solution and the metal electrode, and the thickness of the deposited film is controlled by the concentration of the conductive polymer solution. The spin-coating speed is 5000 rpm, and the spin-coating duration is 1 min. Subsequently, the conductive polymer solution is dried on a heating stage at 40° C. for 4 hours to obtain a dry conductive polymer response layer, thus completing the preparation of the self-assembled avalanche-responsive device.

The self-assembled avalanche-responsive device obtained above is used as a hardware replacement of a reservoir grid layer in the hardware reservoir computing system. The operation process of the obtained hardware reservoir computing system is as follows.

1. An input layer is configured to pre-process raw data, so as to convert the raw data into a timing input pulse sequence. A hardware replacement of a reservoir network layer is realized through the self-assembled network response device prepared above, and the hardware reservoir network layer can respond to the timing input pulse sequence, so as to realize the high-dimensional spatial feature mapping of input information. An output layer is configured to read and train feature map data.
2. The response device is connected to an electrical test platform, where one electrode port of the device is connected to an arbitrary waveform generator, and the other port is grounded, so as to implement the reading and recording of an input signal.
3. Reading and recording of response signals. A programmed timing input pulse sequence is applied to the response device. The pulse width and pulse amplitude of a pulse voltage are adjustable with a pulse width programmable range of 10 us-100 ms and a pulse amplitude programmable range of 1V-10V. After the device has experienced the pulse voltage sequence, the response state of the device is tested and read. A read pulse voltage is 0.1V, a read pulse width is consistent with an input pulse width, and a read interval duration is determined by a recovery duration of a response curve. After each response, the device can spontaneously return to an initial state. Therefore, by repeating the above process, the feature mapping of input information and state collection thereof can be completed.
4. Training and testing of a read signal. A reading function is trained through a machine learning algorithm. Taking image recognition as an example, through a reading record of network response status data of a reservoir of 20,000 training images, a corresponding data set is obtained. The data set is divided into a training set and a testing set, and an appropriate machine learning algorithm (e.g., logistic regression algorithm, Adam algorithm, random, stochastic gradient descent algorithm, etc.) is selected to perform iterative training connection weights of a training set sample until a certain error accuracy is achieved to complete the training. Finally, a testing set sample is used to evaluate the recognition accuracy of the reservoir computing system.

Figure 3:
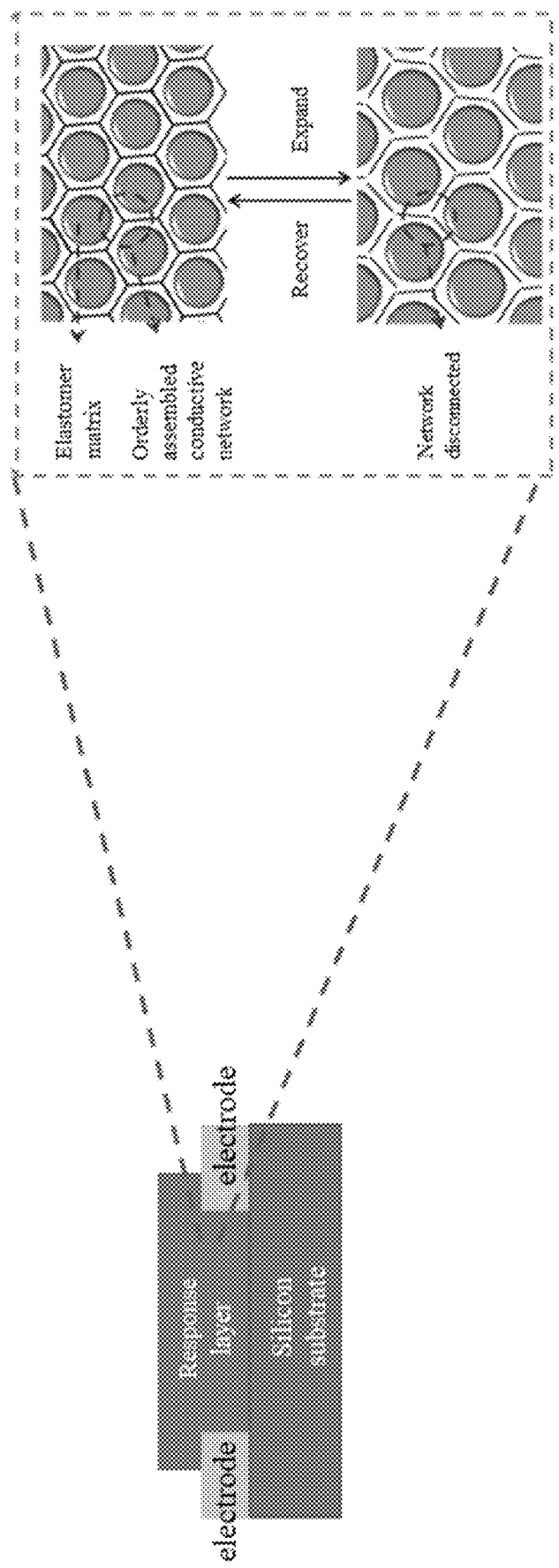
FIG. 3 is a schematic diagram of the structure and principle of a self-assembled avalanche-responsive device of the present invention.

FIG. 3 is a schematic diagram of a microstructure change of the response layer of the self-assembled avalanche-responsive device, which is illustrated by taking an insulating substrate as a silicon substrate as an example. In the figure, circular microspheres are latex particles of waterborne polyurethane solution, which gather at the interface of adjacent latex particles to form an orderly assembled conductive network. The orderly assembly of conductive fillers at a latex particle interface is because of the "connection" effect of the interface modifier so that the conductive fillers can be evenly dispersed and stably gathered at the latex particle interface. When the pulse voltage is applied, the Joule heat effect will cause the volume expansion of the elastomer matrix, resulting in the disconnection of the formed conductive path, and the sharp decrease of conductance of the device. When the voltage is removed, the elastomer returns to an original volume thereof, reconnecting the conductive path, and the conductance returns to an original state thereof. Therefore, the device can present high response amplitude and good electrical uniformity.

Figure 4:
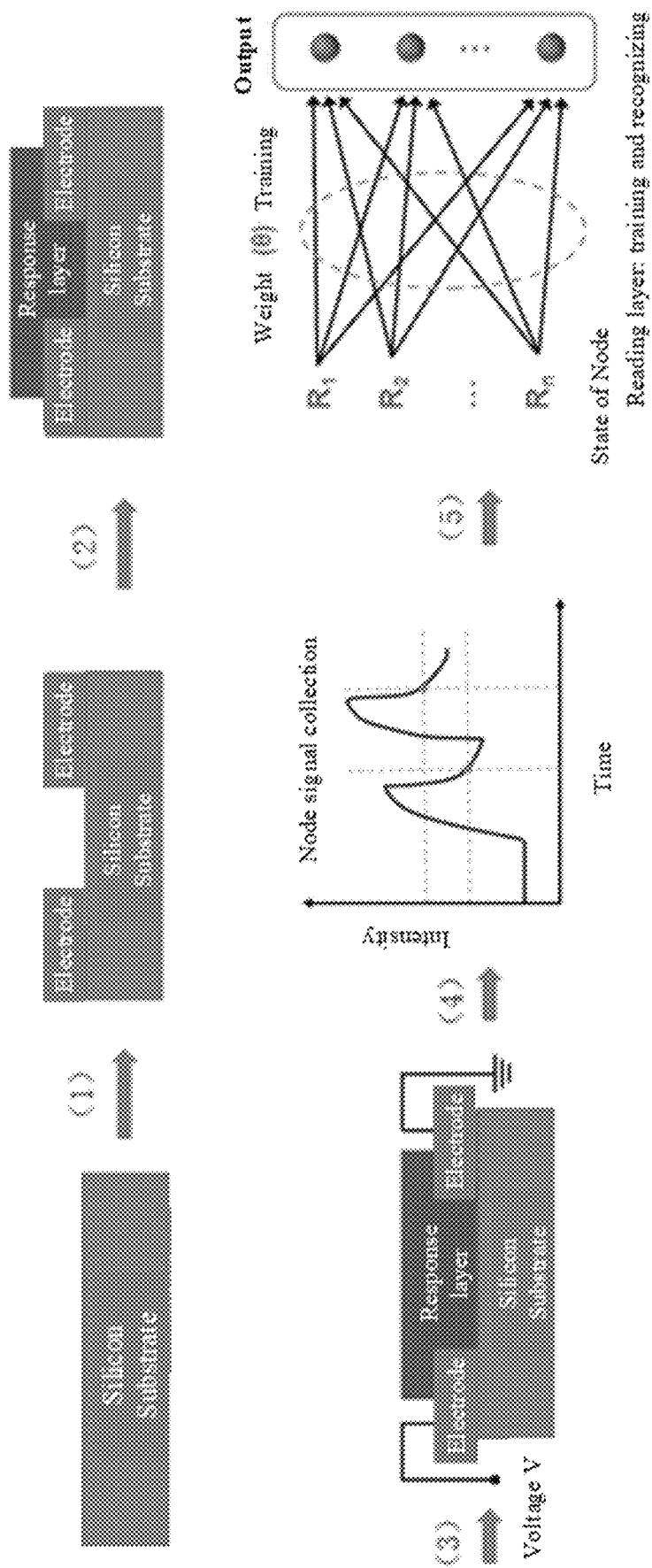
FIG. 4 is a process flow diagram of the preparation and use of a self-assembled avalanche-responsive device of the present invention.
Figure 5:
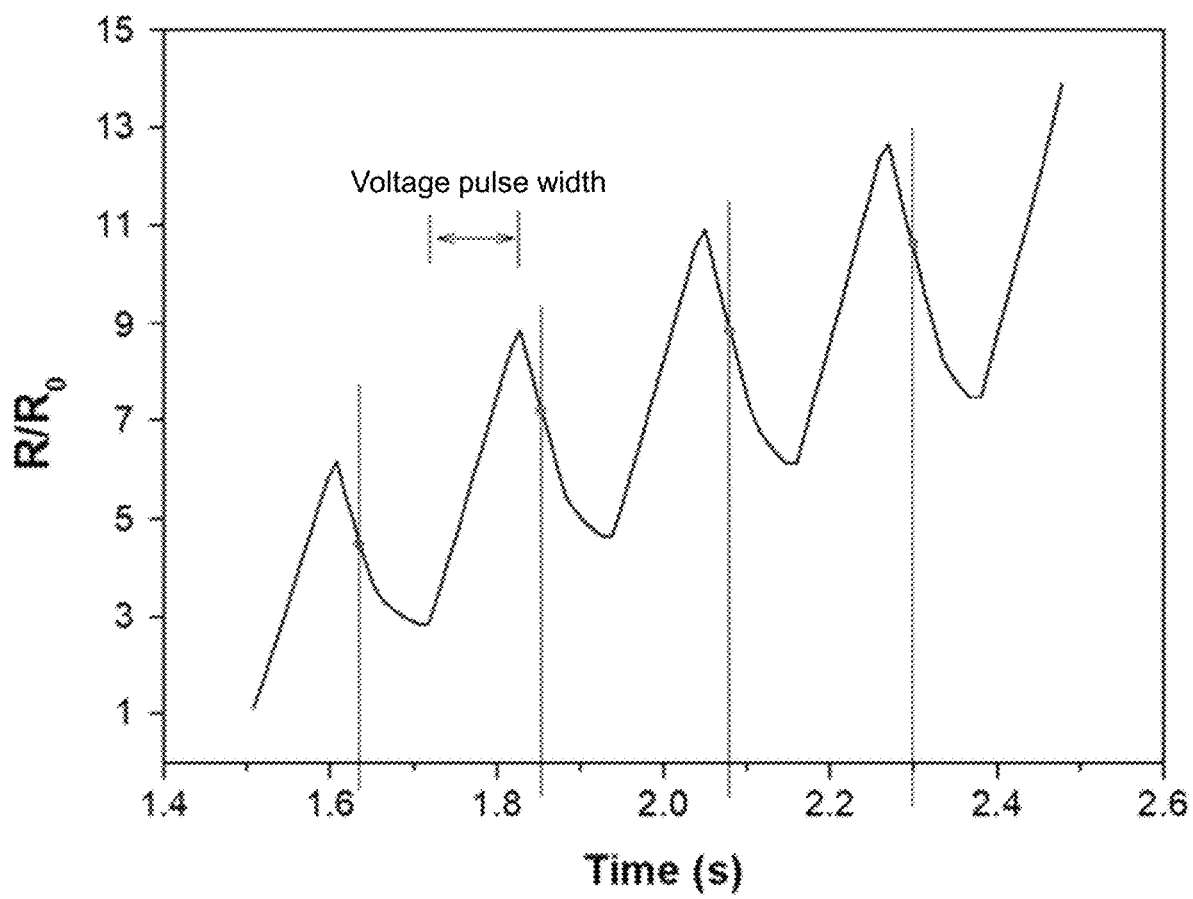
FIG. 5 is a performance diagram of a hardware reservoir computing system of the present invention under the stimuli of a continuous pulse voltage of 1V.

FIG. 4 is a process flow diagram of the preparation of the self-assembled avalanche-responsive device and the use thereof for reservoir calculation (the insulating substrate is illustrated by taking the silicon substrate as an example). The high-dimensional spatial feature mapping of the timing input pulse sequence can be effectively realized by using the self-assembled avalanche-responsive device of the present invention in the reservoir network layer. It can be seen from FIG. 5 that under the stimulus of 1V continuous pulse voltage, the hardware reservoir computing system presents good electrical response characteristics and short-term plasticity characteristics. In the process of applying-canceling the pulse voltage, when the pulse voltage is applied, the resistance increases, and the ratio of R/R0 increases; when the voltage is removed, the resistance value recovers non-linearly. When the interval between two continuous pulse voltages is relatively short, the hardware reservoir computing system begins to respond to a new stimulus while the resistance value has not returned to the initial state. Therefore, the pulse voltage sequence with short continuous intervals can increase the ratio of R/R0 of the device, which presents paired-pulse facilitation (PPF) similar to a synapse and can improve the abundance of the reservoir network nodes.

Figure 6:
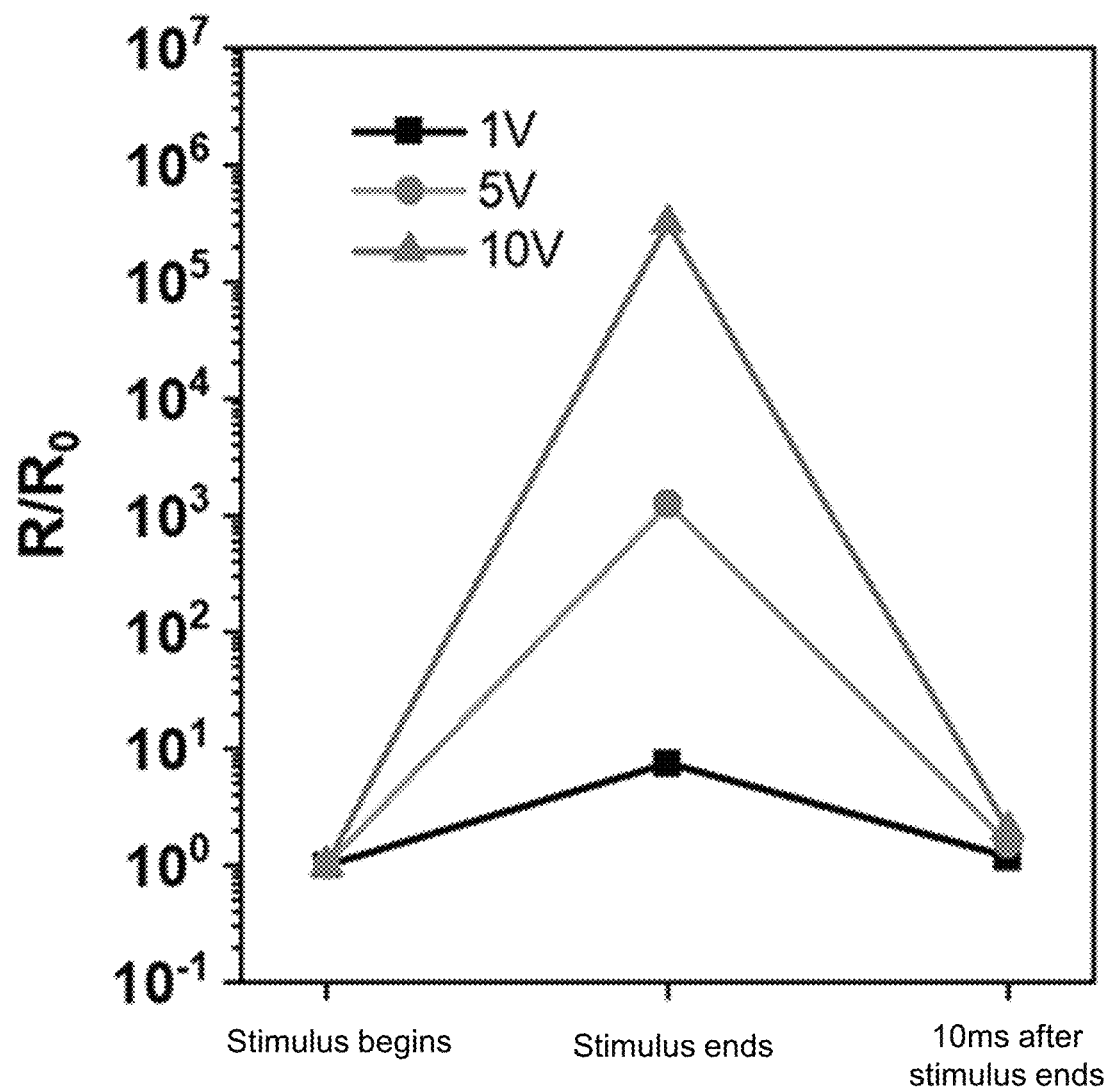
FIG. 6 is a resistance response change performance diagram of a hardware reservoir computing system of the present invention under the stimuli of a pulse voltage of different voltage sizes.

It can be seen from FIG. 6 that the change of the response amplitude of the hardware reservoir computing system increases with the increase of the pulse voltage. When a stimulus of 10V is applied, the resistance ratio increases from 100 to about 106, presenting an 'avalanche' exponential change response. In addition, the response device of the reservoir network layer can return to the initial state, and the electrical response of the device to the same stimulus has good uniformity, which facilitates the improvement of the mapping quality of the reservoir network to the input information.

Figure 7:
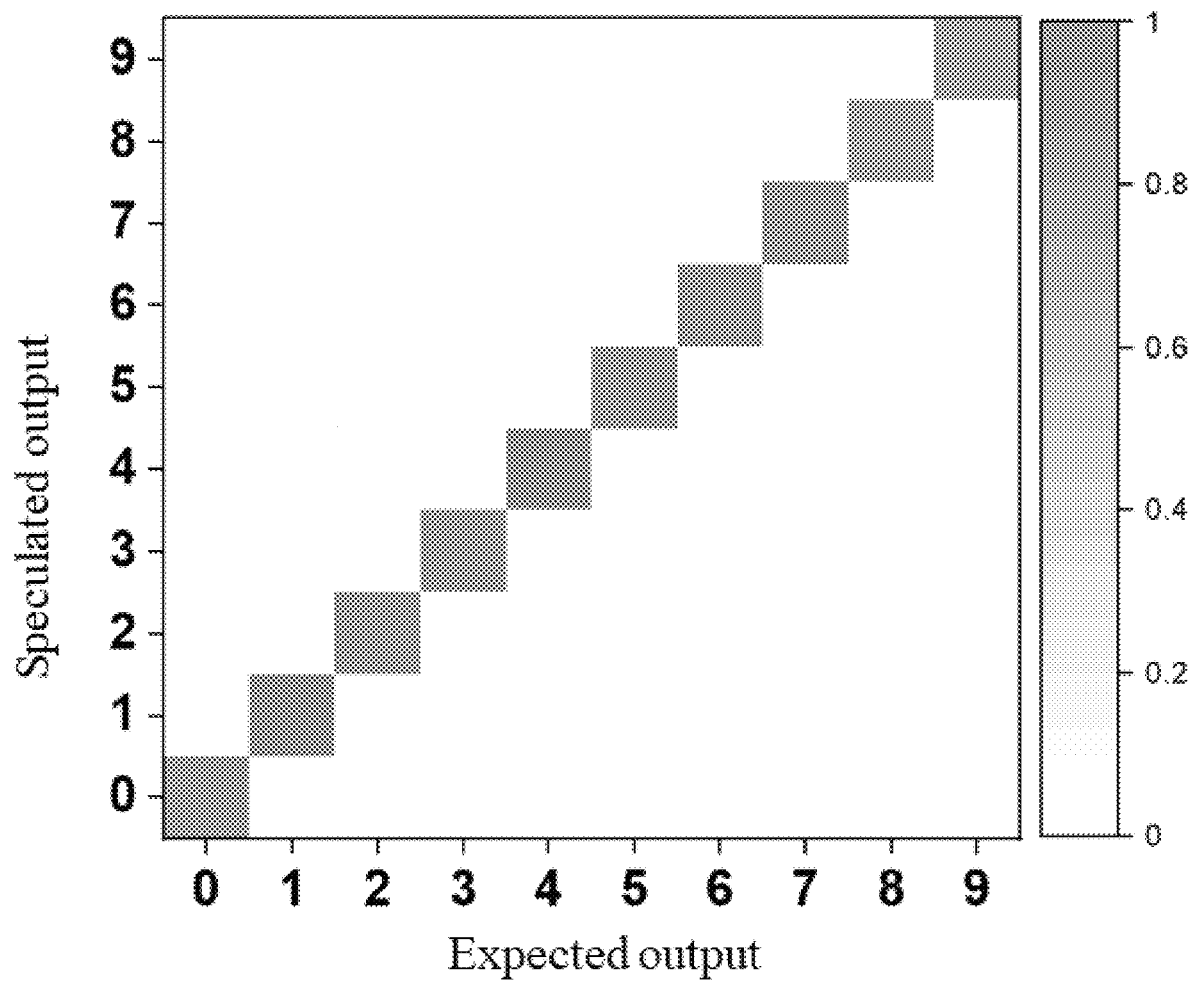
FIG. 7 is a recognition accuracy performance diagram of a hardware reservoir computing system of the present invention for an MNIST handwritten digital data set.

It can be seen from FIG. 7 that the reservoir computing system based on the self-assembled avalanche-responsive device can realize the recognition of MNIST handwritten digital data set, and the recognition accuracy is higher than 95%, presenting high recognition accuracy.

Comparative Example 1

Compared with Embodiment 1, most of the content is the same, except that the addition of the interface modifier is omitted.

In comparative example 1, the conductive network cannot be assembled orderly at the interface of the elastomer matrix due to the lack of dispersion of the conductive filler by the interface modifier and the stable assembly function of the conductive filler at the interface of the elastomer matrix. Therefore, the uniformity and stability of the obtained device are poor, and it is difficult to effectively conduct subsequent electrical tests.

Embodiment 2

Compared with Embodiment 1, most of the content is the same, except that in the present embodiment, the mass ratio of the nano-conductive filler and the elastomer matrix is limited to the mass ratio of the nano-conductive filler and the interface modifier is 0.1:1.

Embodiment 3

Compared with Embodiment 1, most of the content is the same, except that in the present embodiment, the mass ratio of the nano-conductive filler and the elastomer matrix is limited to 100:100; and
the mass ratio of the nano-conductive filler and the interface modifier is 10:1.

Embodiment 4

Compared with Embodiment 1, most of the content is the same, except that in the present embodiment, the mass ratio of the nano-conductive filler and the elastomer matrix is limited to 50:100;
the mass ratio of the nano-conductive filler and the interface modifier is 5:1.

Embodiments 5-10

Compared with Embodiment 1, most of the content is the same, except that in the present embodiments, the elastomer matrix is replaced with thermoplastic polyurethane, waterborne polyurethane, natural rubber, epoxidized natural rubber, dimethyl siloxane, and styrene-ethylene-butadiene-styrene block copolymer of equal mass.

Embodiments 11-14

Compared with Embodiment 1, most of the content is the same, except that in present embodiments, the nano-conductive filler is replaced with metal nanoparticles, metal nanowires, carbon nanotubes, and graphene of equal mass.

The above descriptions of the embodiments are for those of ordinary skill in the art to understand and use the present invention. It is obvious that those skilled in the art can easily make various modifications to these embodiments, and apply the general principles described herein to other embodiments without creative efforts. Therefore, the present invention is not limited to the above-mentioned embodiments. Improvements and modifications made by those skilled in the art according to the disclosure of the present invention without departing from the scope of the present invention should fall within the protection scope of the present invention.

What is claimed is:
1. A preparation method for a self-assembled avalanche-responsive device, comprising the following steps:
(1) taking an insulating substrate and depositing metal electrodes on both ends of an upper surface of the insulating substrate;
(2) taking a nano-conductive filler and an interface modifier, adding the nano-conductive filler and the interface modifier to an elastomer matrix solution, performing stirring and mixing, and performing ultrasonic disper- sion to obtain a conductive polymer solution, wherein in step (2), an elastomer matrix in the elastomer matrix solution is selected from one or more of polyacrylate elastomer, thermoplastic polyurethane, waterborne polyurethane, natural rubber, epoxidized natural rubber, dimethyl siloxane, and styrene-ethylene-butadiene-styrene block copolymer, a solvent used in the elastomer matrix solution is water or an organic solvent, wherein the organic solvent is selected from one or more of methanol, ethanol, toluene, chloroform, acetone, dimethylformamide, and dimethyl sulfoxide, and the mass fraction of the elastomer matrix solution is 5~80%; and (3) spin-coating the obtained conductive polymer solution onto the insulating substrate through a spin-coating process to cover terminals of the two metal electrodes provided opposite to each other; and performing drying after the spin-coating to obtain a conductive polymer film as a responsive layer, so that the preparation of the self-assembled avalanche-responsive device is completed.

2. The preparation method for the self-assembled avalanche-responsive device according to claim 1, wherein in step (1), the insulating substrate is a monocrystalline silicon wafer or a silicon oxide wafer; and the material for the metal electrode is selected from one or more of Au, Ag, Pt, Cu, TiN alloy, CuAg alloy, and AuAg alloy.

3. The preparation method for the self-assembled avalanche-responsive device according to claim 1, wherein in step (2), the interface modifier is an amphiphilic molecule or an amphiphilic polymer with a hydrophilic and lipophilic chemical group, specifically selected from one or more of sodium n-alkyl benzene sulfonate, lignosulfonate, sodium alcohol ether sulfate, sodium dodecyl sulfate, glyceryl stearate, alkyl polyether, primary alcobol ethoxylate, and nanocellulose.

4. The preparation method for the self-assembled avalanche-responsive device according to claim 1, wherein in step (2), the nano-conductive fillers are metal nanoparticles, metal nanowires, carbon nanotubes, graphene or other two-dimensional conductors or semiconductor materials.

5. The preparation method for the self-assembled avalanche-responsive device according to claim 1, wherein in step (2), the mass ratio of the nano-conductive filler and the elastomer matrix is 0.5~100:100; and the mass ratio of the nano-conductive filler and the interface modifier is (0.1~10):1.

6. The preparation method for the self-assembled avalanche-responsive device according to claim 1, in step (2), stirring process conditions are specifically as follows: magnetic stirring is carried out at room temperature for 20~40 min with a stirring speed of 300~500 rpm; an ultrasonic dispersion process is specifically as follows: the ultrasonic dispersion is carried out with a ultrasonic cell crusher with an ultrasonic power of 200~400 W and a total ultrasonic duration of 20~40 min;

in step (3), a spin-coating speed is 1000~7000 rpm, a spin-coating duration is 0.5~1.5 min; and a drying temperature is 30~80° C. and a drying duration is 2~6 h.

7. The preparation method for the self-assembled avalanche-responsive device according to claim 1, the thickness of the metal electrode is 40 nm-200 nm.

* * * * *